(No Model.)   F. C. OSBORN.   2 Sheets—Sheet 1.
POWER TRANSMITTER.
No. 472,223.   Patented Apr. 5, 1892.
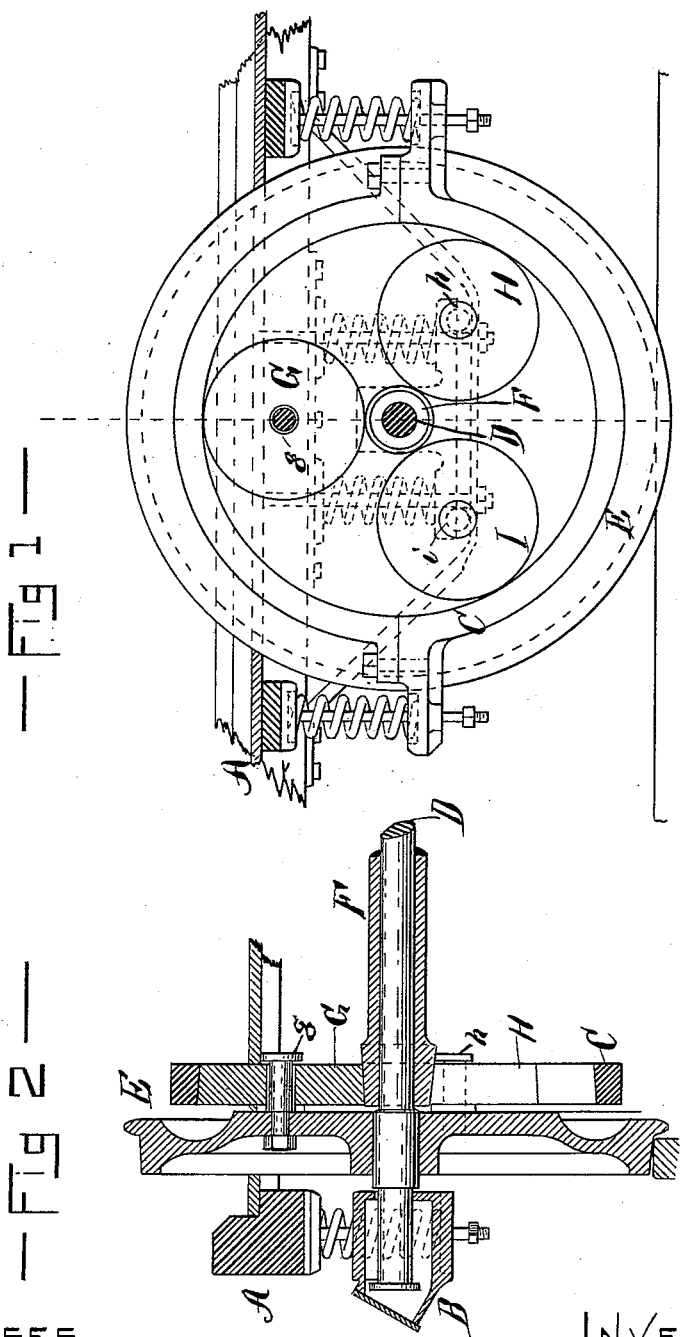

(No Model.) 2 Sheets—Sheet 2.
F. C. OSBORN.
POWER TRANSMITTER.
No. 472,223. Patented Apr. 5, 1892.
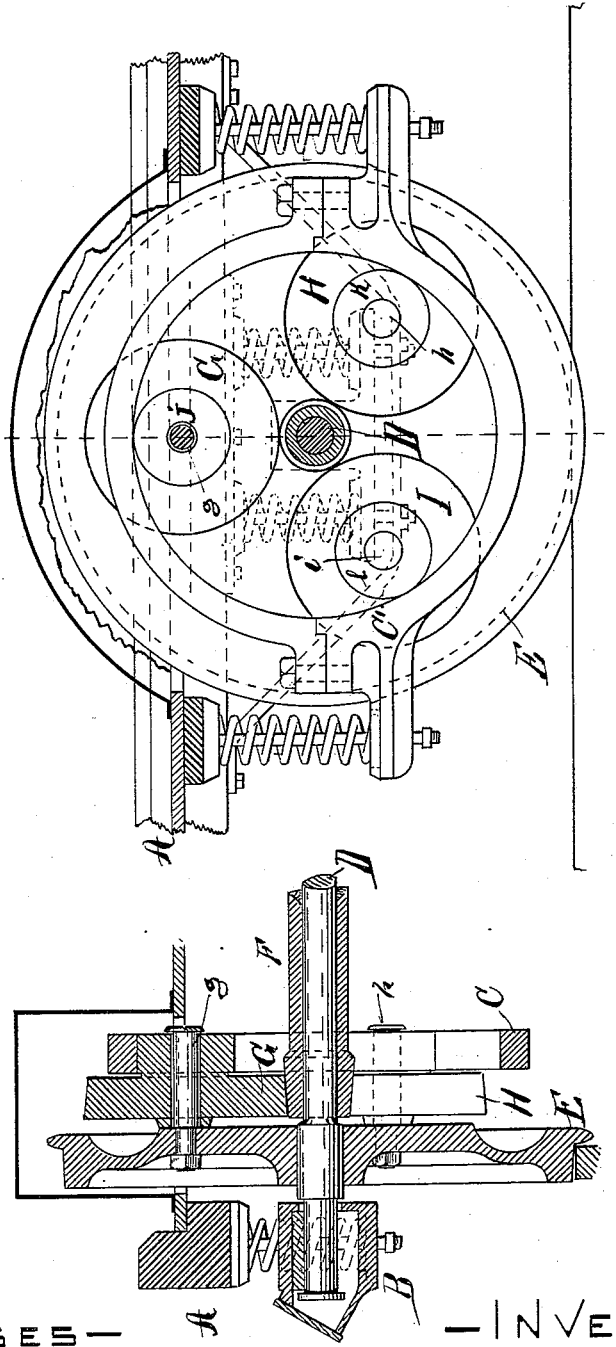
Witnesses
L. H. Bradford
Effie J. Croft
Inventor
Francis C. Osborn
by Parker & Burton
his Attys

UNITED STATES PATENT OFFICE.

FRANCIS C. OSBORN, OF DETROIT, MICHIGAN, ASSIGNOR OF THREE-FOURTHS TO GEORGE MAITLAND, JOSEPH A. MARSH, RALZEMOND A. PARKER, AND CHARLES F. BURTON.

POWER-TRANSMITTER.

SPECIFICATION forming part of Letters Patent No. 472,223, dated April 5, 1892.

Application filed November 14, 1891. Serial No. 411,852. (No model.)

*To all whom it may concern:*

Be it known that I, FRANCIS C. OSBORN, a citizen of the United States, residing at Detroit, county of Wayne, State of Michigan, have invented a certain new and useful Improvement in Machines for Transmitting Power; and I declare the following to be a full, clear, and exact description of the invention, such as will enable others skilled in the art to which it pertains to make and use the same, reference being had to the accompanying drawings, which form a part of this specification.

This invention relates to machines for the transmission of power, and has for its object a mechanism by which rotary motion of high speed may be converted into rotary motion of a lower speed, or the reverse, without the use of offset shafting and the necessary forward and back gear connected therewith. The mechanism employed in changing the rate of speed is shown in the annexed drawings connected with the axle and wheel of a car, where it would be especially useful in converting the high speed of an electric motor to the low speed of a car-wheel; but its usefulness is not limited to that particular structure.

Figure 1 shows in elevation, partly in section, a car-wheel and the connected mechanism. Fig. 2 shows the same in section the long way of the axle. Figs. 3 and 4 show a modification affording greater variation.

Another form embodying some of the principles of this invention is shown in another application for a patent filed by me contemporaneously with this and known as Serial No. 411,851.

A portion of the truck is represented at A, and from the truck is suspended by proper hangers the axle-box B and the fixed ring C. The interior of the ring C is circular. The shape of the exterior is immaterial, except, of course, it is made to conform to the special use to which the device is applied. Concentric with the ring C is the axle D, running in the axle-box B, and upon the axle D is mounted the wheel E, shown in this case as a car-wheel. The wheel E is the wheel of slow motion and is either the driven or the driving wheel. On the axle D is a loose sleeve F, forming the fast-moving wheel. It may itself be used as the wheel or may be simply the hub of the wheel formed upon it. On the wheel E are three or more pinions G H I, each of which has for its arbor a shaft $g\ h\ i$, rigidly fastened to the wheel E, the shafts being equidistant from the center of the wheel E. The end of the sleeve F extends along the axle D into the space between the pinions G H I, and the diameter of the pinion G, added to half the diameter of the portion of the sleeve F which lies next to it, is equal to half the diameter of the interior surface of the ring C, so that the sleeve F is tangent to the pinions G H I and the pinions are tangent to the interior surface of the ring C. The parts may either act on one another through gearing or through frictional contact.

The sleeve F may be driven at a high rate of speed, and this speed will be materially reduced as it is transmitted to the wheel E. For example, if the diameter of the driving part of the sleeve be one, the diameter of the pinion be two, and the diameter of the ring C be five, the relative speed of the sleeve F and the wheel E would be as five to one.

By reducing the diameter of the ring C, as shown in C', Fig. 3, and placing on each of the pinions G H I a hub $j\ k\ l$ of smaller diameter than itself and arranging the hubs so that they are tangent to the inner surface of the ring C' a still greater reduction of speed of the wheel E is obtained, and theoretically this may be reduced so that the wheel E will be motionless, while the driving-wheel F rotates with infinite rapidity. This would happen when the diameters of the hubs $j\ k\ l$ were reduced to zero. Practically, of course, these hubs must be of a size sufficient to support the wheel, and while a very great reduction can be effected practically it can never reach its theoretical limit.

Having thus described my invention, what I claim as novel, and desire to have secured to me by Letters Patent, is—

1. A means for changing the speed from a driving to the driven wheel, consisting of a wheel fixed upon an axle, a sleeve loose upon the same axle, a ring concentric to the axle and fixed upon the frame supporting the axle, and pinions mounted on the said fixed wheel and engaging with both the sleeve and the ring and being tangent to the inner surface of the ring and externally tangent to the said sleeve.

2. A means for changing the speed from a driving to a driven wheel, consisting of a wheel fixed upon an axle, a sleeve loose upon the same axle, a ring concentric to the axle and fixed upon the frame supporting the axle, and pinions mounted upon the said fixed wheel having hubs of different diameters from the pinions, the said pinions engaging with the said sleeve and the said hubs engaging with the said ring and being tangent to the said ring on its inner circumference, substantially as and for the purpose described.

3. A means for changing the speed from a driving to a driven wheel, consisting of an axle, a wheel mounted thereon, a sleeve concentric to said axle, a ring concentric to said axle and fixed with respect thereto, and pinions mounted upon said wheel and engaging with both the sleeve and the ring and being tangent to said ring on its inner circumference and to said sleeve on its outer circumference, substantially as and for the purpose specified.

In testimony whereof I sign this specification in the presence of two witnesses.

FRANCIS C. OSBORN.

Witnesses:
EFFIE I. CROFT,
CHARLES F. BURTON.